United States Patent [19]

Hicks

[11] 4,440,110

[45] Apr. 3, 1984

[54] FLUID FLOW SENSOR AND CONTROL DEVICES AND APPARATUS

[75] Inventor: Mervyn L. Hicks, Eltham, New Zealand

[73] Assignee: Turn-Styles Limited, Mangatoki, New Zealand

[21] Appl. No.: 351,955

[22] Filed: Feb. 24, 1982

[30] Foreign Application Priority Data

Oct. 9, 1981 [AU] Australia .............................. 76219/81

[51] Int. Cl.³ .............................................. A01J 7/00
[52] U.S. Cl. ..................................................... 119/14.08
[58] Field of Search ...................................... 119/14.08

[56] References Cited

U.S. PATENT DOCUMENTS

| | | | |
|---|---|---|---|
| 3,929,103 | 12/1975 | Schluckbier | 119/14.08 |
| 4,033,295 | 7/1977 | Soderlund | 119/14.08 X |
| 4,126,103 | 11/1978 | Olander | 119/14.08 |
| 4,175,514 | 11/1979 | Souza et al. | 119/14.08 |
| 4,185,586 | 1/1980 | Flocchini | 119/14.08 |

Primary Examiner—Hugh R. Chamblee
Attorney, Agent, or Firm—Watson, Cole, Grindle & Watson

[57] ABSTRACT

A milk flow sensing and control device constructed and arranged for use in dairy equipment for sensing the flow of milk from an animal and controlling the actuation of fluid pressure/vacuum operated teat cup support and retraction apparatus and removing and retracting the teat cups from the animal in cessation or substantial reduction of milk flow from the animal; the sensor and control device having a hollow body defining a float chamber and containing a float member and attached actuating member, the float chamber having a main milk inlet and a main milk outlet in the upper part thereof and a minor bleed outlet at the base thereof. A secondary chamber below the body sealed from the float chamber has inlet and outlet ports for pressurized fluid or vacuum, and a valve member normally closing at least one of the ports and movable to the open position by the actuating member on the main milk flow to the float chamber ceasing and milk draining from the float chamber; opening of the valve member providing communication between the ports for the pressurized fluid or vacuum to effect operation of the teat cup support and retraction apparatus and removal of the teat cups.

27 Claims, 15 Drawing Figures

FLUID FLOW SENSOR AND CONTROL DEVICES AND APPARATUS

This invention relates to fluid flow sensor and control devices and to milking teat cup removal apparatus, and more particularly relates to milk flow sensing and control devices and apparatus for use in dairies and intended particularly for use in conjunction with cow milking equipment and teat cup removal apparatus whereby the teat cups of the milking unit can be removed from an animal automatically on cessation or substantial reduction of milk flow from the animal. It will be appreciated, however, that the fluid flow sensor and control part of the invention may have applications other than in dairies and for milk flow sensing and control.

An object of this invention is to provide fluid flow sensor and control means which is effective and efficient in operation, whilst being capable of being manufactured and sold at relatively low cost, but other and more particular objects and advantages of the invention will become apparent from the ensuing description.

According to a first aspect of this invention therefore there is provided a fluid flow sensor and control device comprising a hollow body defining a float chamber and containing a float member, a liquid inlet to the float chamber at the upper part of the body, at least one main liquid outlet from the float chamber opening to an upper part thereof separate from said inlet, a minor or bleed outlet at or near the base of the float chamber for drainage of liquid from the float chamber, said body also defining or being provided with a secondary chamber or duct sealed from the float chamber and having a first port and a second port for the passage of fluid under pressure or vacuum and independant of liquid passing into or out of the float chamber, there being a valve means within the secondary chamber or duct and normally biassed to a first position but being movable against said bias to a second position, one of said first and second positions being a closed position preventing communication between the first and second ports of the secondary chamber or duct and the other of said first and second positions being an open position permitting communication between said secondary chamber first and second ports for the passage of said fluid under pressure or vacuum; movement of said valve means being by way of an actuating member having a portion in the body engaged or arranged for engagement with the float member and movement by said float member on flow of liquid into the float chamber, and said bias being sufficient to cause return of the valve means to the first position on liquid within the float chamber falling below a prescribed level.

According to a second aspect of the invention the sensor and control device of the preceding paragraph incorporates means for varying the timing of actuation of the valving means.

According to another aspect of the invention, the sensor and control device of the two preceding paragraphs incorporates means for providing variation in the maximum buoyancy levels of the float member for actuation of said valve means.

According to a further aspect of this invention there is provided milking teat cup support and retraction apparatus in combination with the sensor and control device of either of the three preceding paragraphs, said apparatus comprising a pneumatic cylinder and piston arrangement with a flexible link connected to the piston through an opening at one end of the cylinder for connection to a milking teat cup assembly, the other end of the cylinder being closed to define an operating chamber between the piston and said closed end part, a vacuum inlet to the closed end part of the operating chamber and whereby vacuum applied to the cylinder operating chamber can effect withdrawal of the piston inwardly of said operating chamber towards the closed end part, said vacuum inlet being connected to one port of the secondary chamber and the other port of the secondary chamber being arranged for connection to a source of vacuum supply, a flexible milk line from the teat cup assembly being connected to the liquid inlet to the float chamber for the supply of milk to said float chamber, and milk line closure mechanism actuable by movement of the piston and connected flexible link to close said milk line on cessation of milking and permit removal and retraction of the teat cup assembly.

As previously indicated, the invention is particularly applicable to milk flow sensing and control apparatus for dairy equipment and the automatic removal of teat cups from an animal on cessation of or substantial reduction in milk flow (one sensor and control device and one teat cup support and removal apparatus being provided for each cow bail or stall); and accordingly preferred aspects of the invention will now be described with reference to such an application and with reference to the accompanying drawings, in which:

FIG. 5A is a view similar to FIG. 5 but illustrating the second position corresponding to FIG. 4a.

Figure 1:
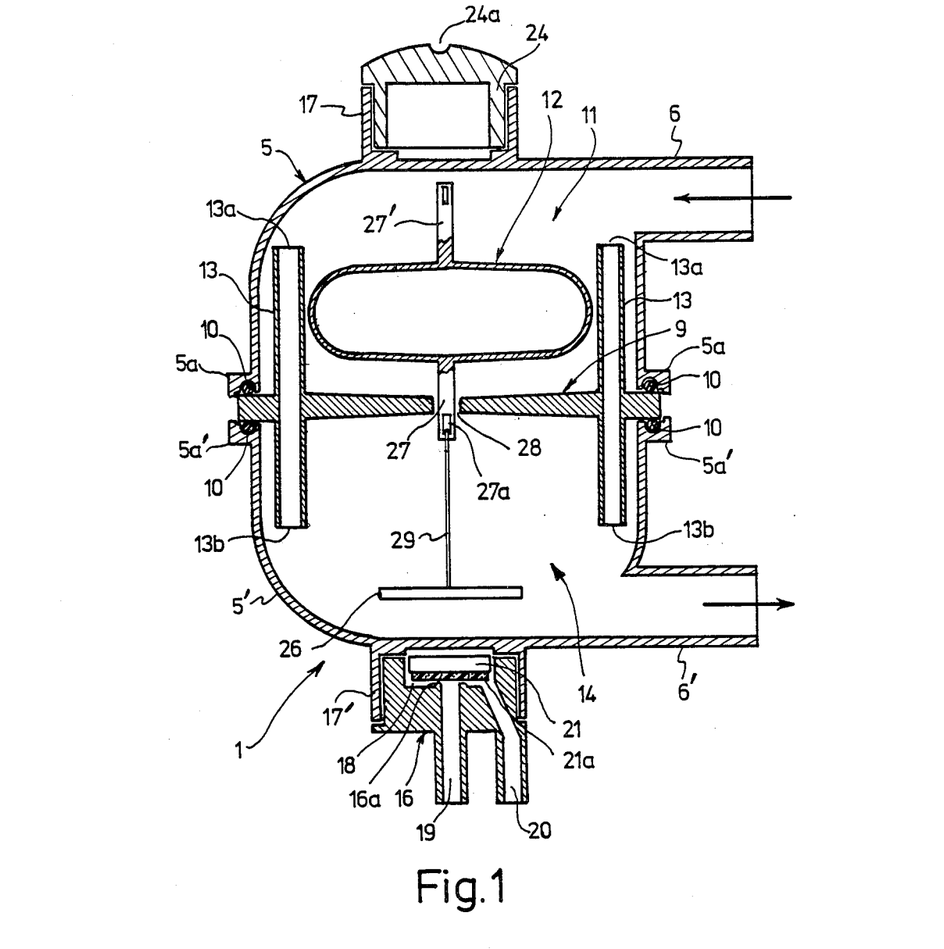
FIG. 1 is a cross-sectional view of a milk flow sensing and control device in accordance with the invention.
Figures 2, 3:
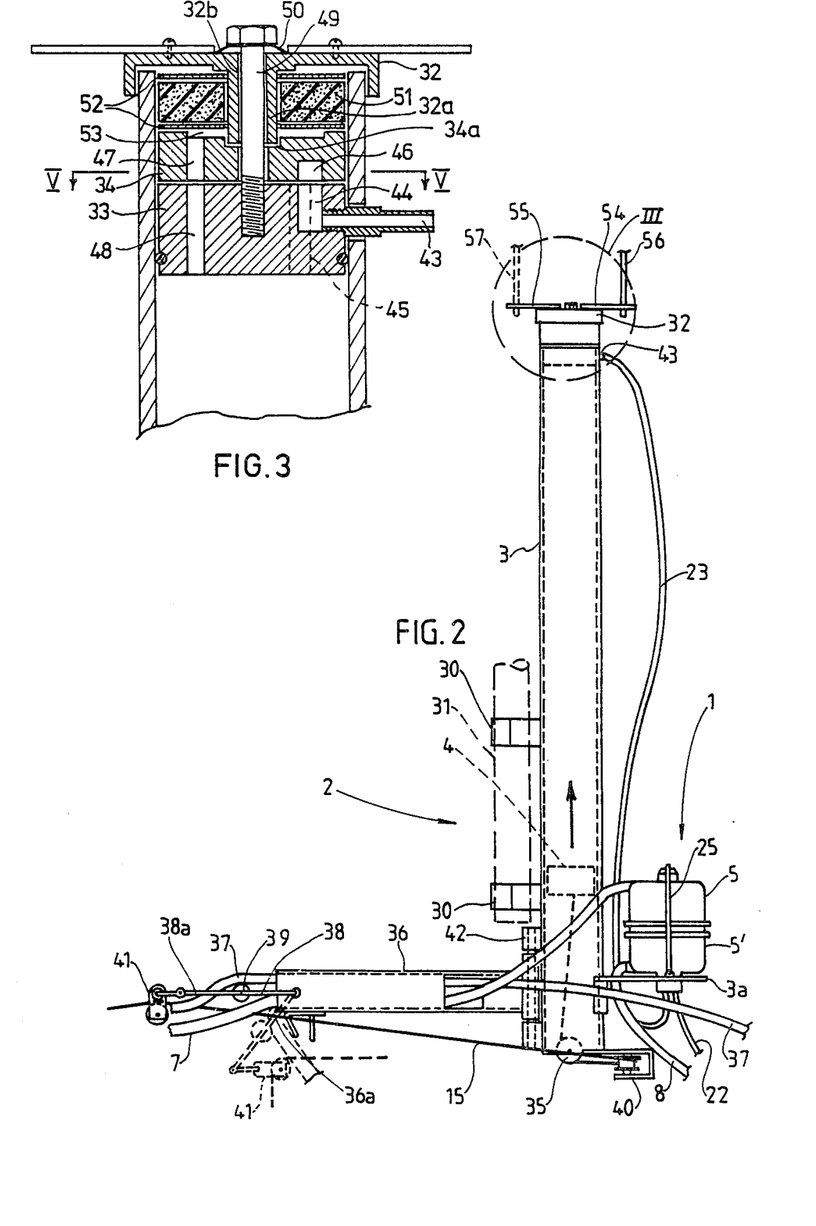
FIG. 2 is a side elevational view of a first teat cup support removal apparatus particularly for use with rotary abreast milking platforms and incorporating or utilising the milk flow sensing and control device of FIG. 1.
FIG. 3 is an enlarged sectional view of encircled part III of FIG. 2.

Referring firstly particularly to FIGS. 1 and 2 of the drawings, the sensor and control device (shown particularly in FIG. 1 and generally indicated by the arrow 1) may be mounted on or adjacent an automatic teat cup removal assembly, generally indicated by the arrow 2, such as by a suitable mounting 3a secured to an outer wall of the pneumatic cylinder 3 and piston 4 arrangement of the teat cup removal assembly 2 in providing a compact unitary assembly for sale as an entire unit for installation in a dairy. The sensor and control device 1 is, however, manufactured and assembled independently and arranged to be easily detachable from the complete assembly 2 for ease of cleaning and servicing as well as being readily available as an individual unit to potential purchasers and users.

It is desirable that any sensor or control device, particularly for use in the dairy industry, should be available at relatively low cost and be easily assembled and dis-assembled for thorough cleaning and without upsetting critical or desirable milk flow and valve timing affecting operation of the milking teat cups and automatic removal, and retraction of such teat cups from the cow on completion of milking. Accordingly, preferred forms of the present invention include a simply and economically constructed sensor and control device which is easily assembled or disassembled without adversely affecting its operation, and additionally providing for alternative milk flow patterns and vacuum cut-off points to accommodate variations in milk flow obtained from animals according to the kind of animal, its condition, seasonal changes and the preference of a farmer/operator.

The preferred sensor and control device 1 is manufactured at least predominently from suitable plastics materials by any known moulding or other process applicable to plastics, and the body part at least of the device 1 is preferably manufactured from a clear plastic material so that its contents and inner condition can be readily seen. The body is preferably manufactured in two main halves with identical and interchangeable upper and lower sections 5 and 5', respectively, facilitating assembly without error, and substantially reducing manufacturing costs. Each section 5, 5' may be of cylindrical cup-like form open at one end and closed at the opposite end and with a main tubular pipe connection extending laterally at the closed end of the cup formation. Thus, when placing the two sections 5, 5' one above the other in opposition the pipe connection 6 at the upper end of the assembled body forms the main inlet to the body for milk drawn from a teat cup assembly (not shown) by way of a flexible milk line 7, and the pipe connection 6' at the base of the assembled body forms a main milk outlet for connection by way of a suitable conduit 8 to such as a milk receiving vat or can (directly or indirectly by way of a main milk collection conduit serving a number of cows and milking assemblies).

The assembled body is arranged to define a float chamber and in one preferred arrangement a horizontally disposed insert or divider member 9 of substantially disc-like form is arranged to have its periphery clamped and sealed, such as by rubber or resilient plastics O-ring seals 10, between opposed peripheral flange portions 5a, 5a' (which may be provided with annular recesses for the seals 10) at the open ends of the sections 5, 5' of the body so that the float chamber 11 is confined to the upper part of the body within the upper section 5, and the divider member 9 forms the base of the float chamber 11 in which a float member 12 is located. The divider member 9 is provided with at least one, but preferably two or more conduit parts 13 which extend substantially normal to the plane of the divider disc member 9 so as to each have a portion extending upwardly substantially vertically to have an open upper end 13a terminating in the upper part of the float chamber 11 and a lower end 13b opening to the lower chamber part 14 of the lower body section 5' to allow milk to flow through the conduits 13 and out through the main milk outlet 6' whilst milk is flowing and the float chamber 11 is full or substantially full of milk from the milk inlet 6. To provide an alternative position for milk level and outlet in the float chamber 11, each conduit part 13 of the divider member 9 may extend also downwardly below the divider member 9 into the lower chamber 14 but for a distance different from the distance of the first mentioned upwardly extending portions of the conduit parts 13 so that the divider member 9 can be simply inverted on assembly or re-assembly in providing a different outlet level for the milk in the float chamber 11.

In the present form of the invention, the sensor and control device 1 is arranged to control vacuum supply to a vacuum cylinder 3 of the automatic teat cup removal and retraction assembly 2 for control of its piston 4 which is connected by a flexible link 15 such as a cord or wire to the teat cup assembly (not shown), and accordingly the device 1 is provided with a valve housing and conduit connector piece 16 which may locate in and be secured to an annular flange projection 17' depending from the closed lower end of the lower body section 5' to define a valve chamber 18 sealed from the main interior chambers 11 and 14, of the body 5, 5' and with which two conduit connections 19 and 20 communicate. The valve chamber 18 houses a valve member 21 capable of closing communication between the inner ends of the conduit connections 19 and 20, and preferably such valve member 21 comprises a magnetic valve member 21 which is normally biassed under its own weight to seal the inner end of at least one of the conduit connections 19 or 20, but is capable of being lifted by magnetic attraction against its weight bias to open communication. In the particular form illustrated, one conduit connection 19 is centrally located so as to be coaxial of the body 5, 5 and float member 12, and the periphery of the conduit connector piece 16 at the inner end of said one conduit connection 19 is provided with or defines a valve seat 16a on which the valve member 21, which may be of disc form, can rest to close off the said one conduit 19. The valve member 21, which may be a permanent magnet, can be provided on its underside with a resilient disc seal 21a. The noted one conduit connector 19 is arranged to be connected to a source of constant vacuum supply such as by a suitable flexible pipe 22 and the other conduit connection 20 is located to one side thereof and is arranged for connection by a flexible pipe 23 to the upper end (when vertically disposed) of the pneumatic cylinder 3 of the automatic teat cup removal apparatus 2.

As previously mentioned, it is preferred that both upper and lower sections 5 and 5' of the body are identical and thus the closed end of the upper section 5 may similarly be provided with an annular outer concentric flange 17, but as this is not required to accommodate a valve connection or insert piece 16, a suitable capping piece or plug 24 can be inserted therein and such capping piece or plug 24 may have a recess 24a on its upper side in which can locate an upper part of a spring wire strap or like inverted U-retaining member 25 (which has its lower ends pivotally engaged with the lower part of the body 5, 5' or the mounting 3a therefore) serving to secure the body parts 5, 5' together in a positive but simple and easily detachable fashion. If connected to the mounting plate 3a, the strap 25 may also serve to hold the sensor and control device 1 in position.

To effect lifting of the magnetic valve member 21 (which can alternatively be an electro-magnetic valve member instead of a permanent magnetic valve member), an actuating member 26 in the form of a steel plate disc is arranged to depend from the float member 12 and be suspended co axially of and within the body 5, 5' over the location of the magnetic valve member 21 so as to be magnetically co-operable therewith when in close proximity to the base of the body. To this end, the float member 12 may have a co-axially depending stem 27 which is arranged to locate as a loose fit through a co-axial bleed hole 28 in the divider member 9 and to have an aperture 27a in its lower end part arranged to receive a hooked upper end portion of a support link member 29 for the actuating member 26, so that when the float chamber 11 is empty of milk and the float member 12 at its lowest level resting on the divider member 9, the actuating member 26 is suspended just clear of the inner side of the base or closed end of the lower body section 5′. In order to provide an alternative setting for the location of the actuating member 26 relative to the base of the lower body section 5′, and thus relative to the magnetic valve member 21, for variance in the prescribed level at which the float member 12 and connected actuating member 26 will effect movement of the valve member 21 under magnetic influence, the upper side of the float member 12 can be provided with a co-axial upstanding stem portion 27′ substantially identical to the depending stem portion 27 but of different length, so that the float member 12 can be inverted to provide the alternative connection for the actuating member link 29.

Preferably the disc member 9 has its upper face sloped downwardly and inwardly towards the bleed hole 28 for full drainage of milk in the float chamber 11 - in a reversible disc member construction the opposite face will be similarly sloped.

In a modification of the invention, the actuating member 26 can be of a magnetic material and the valve member 21 of steel or like material capable of being acted upon by magnetic forces.

The automatic teat cup removal apparatus incorporating the milk flow sensing and control device 1 in accordance with the invention includes the cylindrical tube member 3 reciprocally housing the piston 4 as previously mentioned, and for one preferred application of the invention to rotary milking platform apparatus the cylinder 3 may be mounted vertically and secured such as by suitable clamps 30 to a vertical rail part 31 of a cow bail or stall on the platform. In this arrangement, and referring also now to FIGS. 4, 4A, 5, 5A of the drawings, the upper end of the cylinder 3 is closed by a partially rotatable capping piece 32 and a rotary valve assembly including a fixed part 33 and a rotatable part 34; and the lower end of the cylinder 3 is open and provided with pulley mountings 35 over which the flexible link 15 between the teat cup assembly and piston 4 can locate so that supply of vacuum to the upper part of the cylinder 3 by way of the conduit 23 will draw the piston 4 upwardly to effect retraction of the teat cup assembly away from the animal to a support position, and by opening the upper part of the cylinder 3 to atmosphere and breaking the supply of vacuum to such upper part the teat cup assembly connected to the piston 4 can be let down for attachment to an animal.

In the preferred form of the invention, and as illustrated, the teat cup removal apparatus or assembly 2 includes a horizontally pivotable support arm 36, which may be an inverted channel or tubular member, and the main flexible and resilient milk line 7 from the teat cup assembly extends along such support arm 36 to have its inner end part connected to the milk inlet 6 of the device 1; and a flexible pulsator conduit 37 connected to the teat cup assembly may also be supported by such support arm 36.

The support arm 36 preferably includes means to restrict vacuum and milk flow in the milk line 7 on cessation of milking to thus enable the teat cups to fall away from the cow's udder; and in the arrangement illustrated in FIG. 2 of the drawings such vacuum and milk cut-off is effected by providing a U-shaped lever member 38 having its leg portions pivotally connected to the free end part of the support arm 36, and having a pressure element such as a transverse roller or bar portion 39 arranged so that the flexible pulsator conduit 37 passes between such roller or bar portion 39 and the closed end 38a of the U-shaped member 38, and the milk line 7 passes between the roller or bar portion 39 and a lower transverse end part 36a of the support arm 36, so that a pivoting of the U-shaped member 38 downwardly will effect bending and/or a pinching of the milk line 7 and thus a closure of the milk line 7 at that point without closing the pulsator conduit 37. To effect such pivoting and milk line 7 closing movement, the flexible link 15 connected to the piston 4 and teat cup assembly may pass by way of a laterally or off-set mounted pulley wheel 40 at the base of the upright cylinder 3 and a pulley or loop connection 41 at the outer closed end 38a of the U-shaped member 38, so that when the piston 4 is retracted and a pull exerted on the flexible link 15 the pull is simultaneously transmitted to the U-shaped member 38 to pull such U-shaped member 38 downwardly and also pivot the support arm 36 laterally about its hinge connection 42 with the cylinder 3. In so doing the teat cup assembly is pulled away from the animal with or following a vacuum cut-off in and/or to the milk line 7, and simultaneously retracted and subsequently supported by the support arm 36, which is pivoted clear of the stall in which the animal is located to allow the animal to move out of such stall.

It is envisaged that the teat cup removal and support apparatus in accordance with this invention, including the sensor and control device 1, may be used in stationary dairies, e.g., herringbone sheds, or in dairies utilizing a rotating platform on which cows are rotated on milking, a preferred rotating dairy construction to which the present invention may be applied is that manufactured and sold under the name TURN-STYLE (Trade Mark) and the subject of U.S. Pat. No. 3,709,196, although it will be appreciated that the present invention may be applicable to other rotary dairy constructions. Also, the invention is not confined to the particular automatic teat cup removal and support apparatus described and illustrated herein, but may be applied to other pneumatic ram operated teat cup support and removal apparatus such as that the subject of our U.S. Pat. No. 3,738,321 and modifications thereof.

Operation of the present form of the teat cup support and removal apparatus is arranged to be effected by the rotary valve mechanism herein described with reference to the drawings, and such rotary valve mechanism can also be provided to adapt other pneumatic piston retraction systems.

Figure 4:
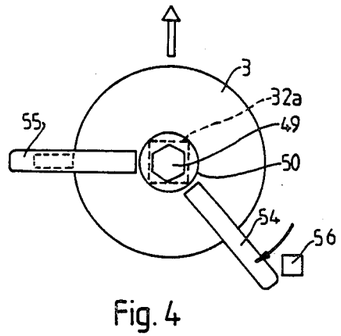
FIG. 4 is a plan view in the direction of arrow IV of FIG. 3 and illustrating a first position.
Figure 5:
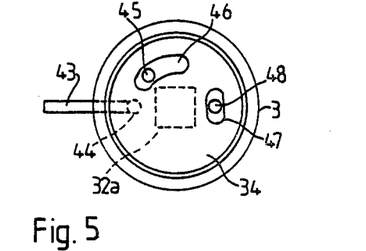
FIG. 5 is a cross-sectional view on line V—V of FIG. 3 and corresponding to the first position of FIG. 4.

The rotary valve switching mechanism includes a fixed or stationary lower end closure piece 33 closing the upper end of the cylinder 3 and having an inlet connection 43 for the vacuum supply conduit 23 in communication with an inlet vacuum port 44 opening to the upper face of the stationary part 33, and a separate inlet vacuum passage 45 on the same pitch circle providing communication between the upper and lower faces of the stationary part. The rotatable part 34 of the valve mechanism is a rotary disc valve member located above the stationary part 33 to have its lower face in sliding contact with the upper face of the stationary part 33, and such rotary valve member 34 is provided with in its lower side with an arcuate bridging slot 46 extending in concentric relationship and disposed so that in a first position the constant vacuum port 44 is closed by the rotary disc member 34 and the bridging slot 46 located to one side thereof extending over the second communicating passage 45 in the stationary part 33. Another slotted port 47 extends fully through the rotary valve member 34 and is located over and thus in communication with a further passage 48 extending fully through the stationary part 33 to open the upper part of the cylinder 3 to atmosphere.

Figure 4A:
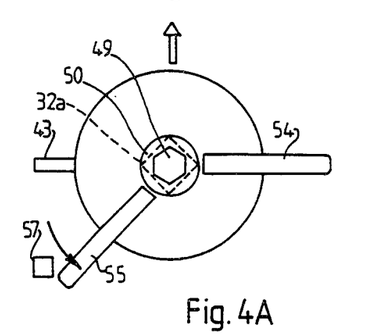
FIG. 4A is a view similar to FIG. 4 but illustrating a second position.
Figure 5A:
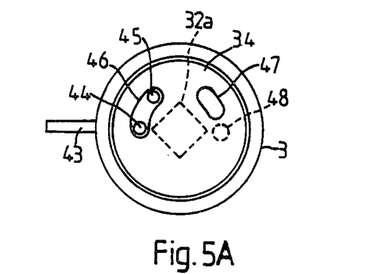

In a second position of the rotary valve member 34, the bridging port 46 bridges the main constant vacuum ports 44 and second passage 45 of the fixed part 33 to place the upper part of the cylinder 3 in communication with the source of vacuum supply, and the atmospheric port 47 in the rotary valve member 34 is moved to one side of the atmospheric port or further passage 48 through the stationary member 33 to close such atmospheric passage 48 in the stationary member 33 off from communication with the atmosphere.

The upper end of the cylinder 3 is provided with a rotary cap member 32 arranged to effect the required partial rotation of the rotary valve member 34, and to this end such rotary cap member 32 can be provided with a depending squared shank portion 32a locatable in a corresponding squared central recess 34a in the upper part of the rotary valve member 34, and the cap member 32 secured in position by means of a securing bolt 49 passing through a spring washer 50 and a co-axial aperture 32b in the capping member square section 32a to have its lower end in screw-threaded engagement with the stationary part 33 of the valve assembly. Preferably a filter arrangement is provided for the apparatus to prevent dust entering the vacuum cylinder 3 from atmosphere, and in one arrangement a filter member 51 such as a resilient foamed plastics filter member 51 of disc form is located between a pair of gauze or mesh metal or plastic discs 52 located between the upper face of the rotary valve member 34 and the capping member 32, the filter assembly being apertured for receipt of the depending squared section 32a of the capping member 32. The upper face of the rotary valve member 34 can be provided with a medial annular recess 53 forming an atmospheric chamber serving the atmospheric port 47.

Rotation or partial rotation of the capping member 32 to effect operation of the rotary valve assembly may be effected by providing two laterally extending arms 54, 55 which are arranged in turn to be contacted by suitably positioned stationary contact members 56, 57 as the rotary milking platform rotates.

Thus, in operation of the invention, in the first stage of rotation of the platform the teat cup assembly arrives at an operator's position supported by the swinging support arm arrangement of the automatic cup removal assembly 2, and the upper part of the cylinder 3 passes a fixed point at which the first stationary contact member 56 contacts the arm 54 to turn the valve to the first position aforementioned. This cuts the vacuum supply from the pneumatic cylinder 3 and piston 4 arrangement by moving the bridging port 46 of the rotary valve member 34 away from the constant vacuum port 44 and at the same time opening the further passage 48 to atmosphere to allow the weight of the teat cup assembly to pull the piston 4 down towards the lower open end part of the cylinder 3 so that the operator can then apply the teat cups to the cow.

In normal operation, milk from the cow starts to flow into the float chamber 11 of the sensor and control device 1 until such time as the milk reaches the top or upper open ends 13a of the outlet flow conduits 13, the milk being retained in the float or upper chamber 11 of the device 1 and only a very small quantity will be permitted to escape via the bleed hole 28. The spacing of the magnetic valve member 21 and the actuator member 26 will have been increased by the action of the float member 12 rising in the milk to overcome the magnetic pull and permit the valve member 21 to drop under its own weight and rest on the valve seat 16a to cut off communication between the first connection 19 connected to the source of constant vacuum and the second connection 20 connected by way of the conduit 23 to the upper part of the cylinder 3.

Following this operation and after the milking platform has completed a part of its revolution and milk has had time to fill the upper float chamber 11 of the device 1, the mechanically operated valve assembly at the top of the cylinder 3 passes a second point at which a second fixed contact member 57 (similar to the first fixed contact member 56 but mounted at a different radial point from the first contact member 56 so as to be located on the opposite side of the cylinder 3 and upper valve assembly) is contacted by the second arm 55 of the capping member 32 to turn the capping member 32 and rotary valve member 34 to the second position referred to previously. By this operation air in the cylinder 3 is allowed to travel by way of the conduit 23 back to the second chamber 18 at the base of the device 1 to create an air/vacuum differential on the valve member 21 to thus maintain sealing of the valve member 21 on its seat 16a. At the same time the atmosphere port or passage 48 in the upper rotary valve assembly is closed.

Milk continues to flow through the milk flow conduits 13 and bleed hole 28 from the upper float chamber 11 into the lower chamber 14 of the device 1 and out through the main milk outlet 6' until such time as the cow ceases to let down milk, or reduces the amount of milk let down, and the milk flow falls below a predetermined rate governed by the flow through the bleed hole 28. All the milk remaining in the upper float chamber 11 of the device will then escape via the bleed hole 28 allowing the float member 12 to lower until such time as the magnetic valve actuator 26 comes under the influence of the magnetic valve member 21 and the two are drawn together overcoming the pull of the constant vacuum on the valve member 21 at the seat 16a, to thus open the valve menber 21 and permit communication between the constant vacuum connection 19 and the cylinder 3. Application of the vacuum to the cylinder 3 draws the piston 4 upwardly the full length thereof and in so doing mechanically removes the teat cups from the cow so that they are supported by the swinging arm arrangement described. In the arrangement described also and as in the construction according to U.S. Pat. No. 3,738,321 and its modifications, such retraction also closes off the main milk line 7. The teat cup assembly is thus supported until such time as the unit again passes the first activating point.

The first described constructions of sensor and control device provide for a number of prescribed alternative settings according to the particular manner of assembly of the respective parts, in particular the arrangement of the divider 9 and attached conduit parts 13 and/or the float member 12. However it may be preferable to provide a construction whereby the settings of the parts determining the opening and closing of the valve member 21 can be gradually varied and can further be so varied without dismantling and re-assembling of the device 1.

Firstly, the time between cessation of milk flow from an animal and actuation of the valve member 21 by approach of the actuating member 26 is affected by the volume of milk in the upper chamber 11 below the conduit upper opening(s) 13a and which is required to pass through the bleed aperture 28; and such volume can be varied according to the displacement made by the float member. Thus the device 1 can be provided with a variable stop means adjustable from outside the device 1 and arranged to limit the extent of upward travel of the float member 12 and vary the extent to which it is submerged. This can be done simply as illustrated in FIG. 6 such as by providing a screw-threaded adjusting or control member 58 in a threaded plug 59 inserted within the upper flange 17 part, the control member 58 having an outer knurled knob 58a and its threaded shank 58b extending downwardly through an aperture in the upper wall of body section 5 and providing an abutment for the upper side of the float member 12 or an upper projection 12a thereof.

As an alternative to the provision of a screw-threaded variable stop, the maximum rise of the float member 12 can be varied by a cam arrangement between the float member and a turnable control member at the upper end of the sensor device 1. In the arrangement illustrated in FIG. 7 the upper surface 12b of the float member 12 is formed in a helix or part helix, and a control member 60 has an outer knurled knob 60a and a stem 60b rotatably located in and through an upper plug 61 to extend into the upper chamber 11 and have a laterally extending finger 60c the outer end of which is arranged to contact the helical upper face 12b of the float member 12. In the arrangement shown in FIG. 8, the stem 60b of the control member 60 is provided at its lower end with a helical cam 60d arranged to be contacted by an upper projection 12a of the float member 12—the stem 60b will necessarily be offset axially relative to the float projection 12a and if it is the projection 12a that is offset the float member 12 will require to be prevented from rotation, as it will also in the arrangement according to FIG. 7. To prevent the float member 12 rotating in operation it is envisaged that the upper conduit(s) 13 can form a guide(s) with the float member 12 being either shaped to locate around, or partially around e.g., by being recessed at the respective side(s), the conduit(s) 13 or being provided with spaced projections locatable either side of the conduit(s) 13.

Figure 6:
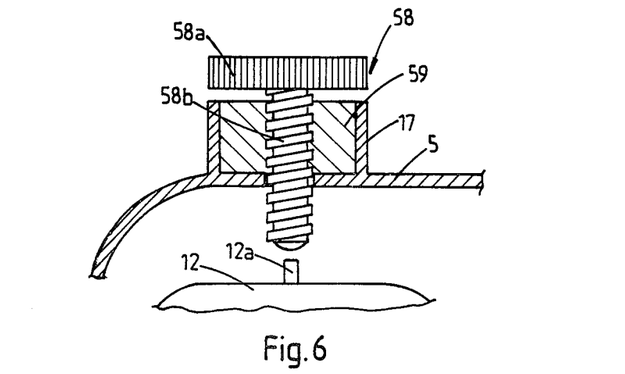
FIGS. 6, 7 and 8 are fragmentary views illustrating modifications to the invention.
Figure 7:
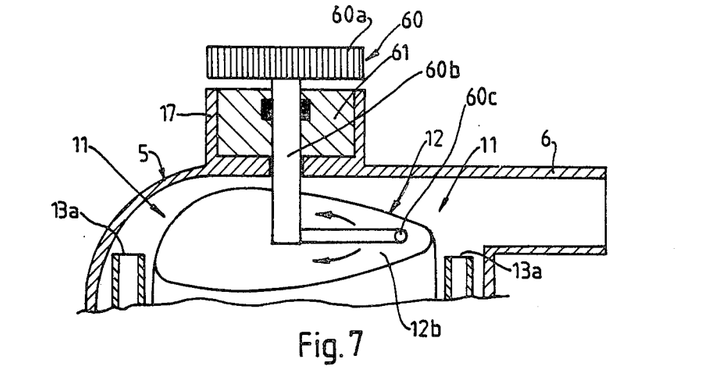
Figure 8:
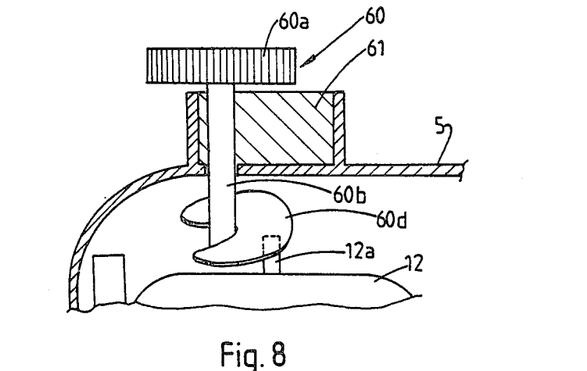
Figure 9:
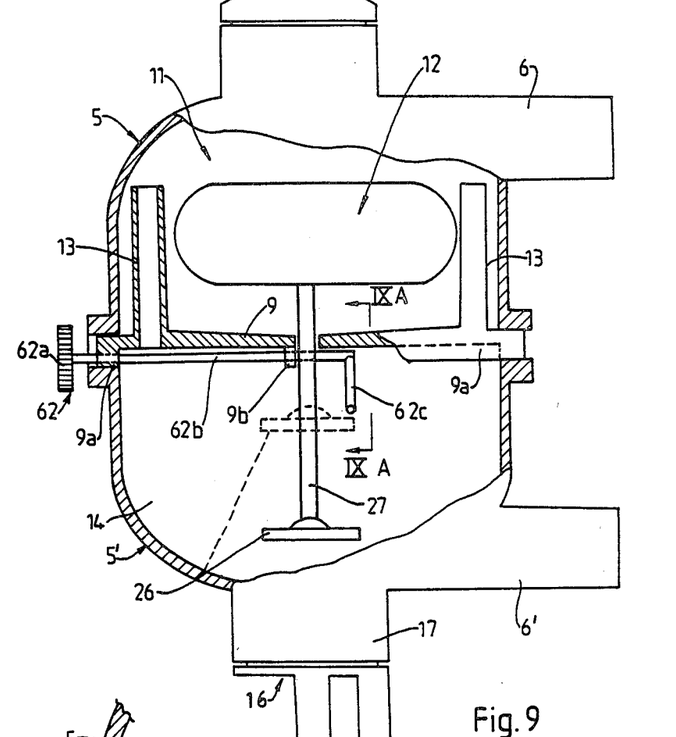
FIGS. 9 and 12 are views similar to FIG. 1 and illustrating other modifications of the sensor and control device.
Figure 9A:
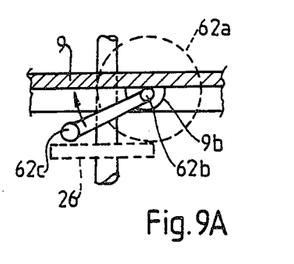
FIG. 9A is a view in the direction of arrows IXA—IXA in FIG. 9, and FIGS. 10 and 11 are fragmentary views illustrating still further modifications.

In many milking installations however, the sensor and control device 1 is likely to be mounted high relative to an operator and the control member according to FIGS. 6, 7 and 8 may not be conveniently placed for turning and/or viewing of any graduation markings provided on the control member or a dial associated therewith. Accordingly, it may be preferable to locate the outer control knob or lever with associated markings or dial to one side of the device 1, and one preferred construction is shown by way of example in FIGS. 9 and 9A of the drawings. In this arrangement the divider member 9 is constructed to provide support for a control member 62 having an outer knurled knob 62a (alternatively a lever) and a rotatable shaft 62b extending into the lower chamber 14 to have a laterally and downwardly inclined finger 62c the outer end of which is arranged to be contacted by the upper surface of the actuating member 26 (or a fixed collar or plate) on the float lower stem 27 (or extension 29 thereof). The control member shaft 62b can extend through aligned apertures in an outer peripheral depending flange part 9a and an inner lug 9b of the divider member 9, or otherwise mounted in or on the divider member 9, in preference to mounting on the wall of the lower body section 5'.

Figure 10:
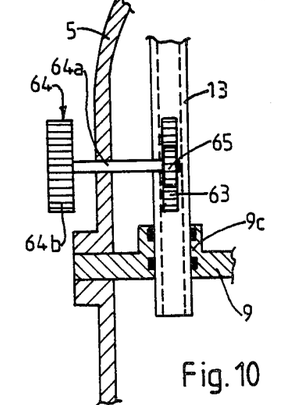

In a still further alternative, it is envisaged that instead of varying the volume of milk below the conduit upper end 13a by buoyancy displacement of the float member 12, the volume can be varied by adjustment of the relative height of the conduit upper end 13a (in the event of there being more than one conduit 13 it is still only necessary to adjust one for effective main volume variation). This can be done as shown by way of example in FIG. 10 by slidably mounting the conduit 13 in and through an appropriately formed part 9c of the divider member 9 and by a rack and pinion arrangement with the conduit provided on one side with a rack 63 and the control member 64 with a co-operating pinion 65 on a rotatable shaft 64a extending through a side wall of the upper body section 5, the shaft 64a having an outer knob 64b (or lever).

In yet another modification of the invention means can be provided for varying the rate at which the quantity of milk initially contained in the upper float chamber 11 below the conduit upper end 13a is drained therefrom on cessation of the main flow of milk from the animal; and this can include the dimensioning of bleed aperture 28 (and the float stem 27 when provided and extending through aperture 28) to permit minimum milk flow or draining through such aperture 28 catering for the slowest milking cow, and the provision of a second bleed aperture and co-operating needle valve by which milk draining can be varied within prescribed limits to cater for faster milking cows.

Figure 11:
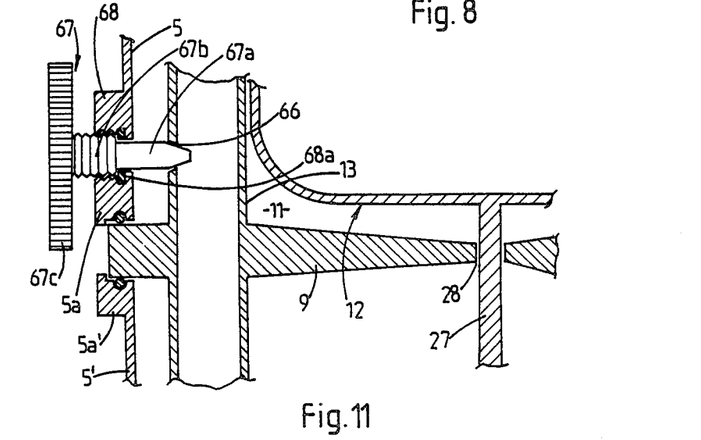

One arrangement for providing this variable bleed control is illustrated by way of example in FIG. 11 and shows a second bleed aperture 66 provided in the wall of outlet conduit 13 near the divider member 9, and an adjustable needle valve 67 with a valve stem 67 having a conical or tapered end part locatable at least partially in the aperture 66. Adjustment of the needle valve 67 being by way of a screw-threaded part 67b located in and through a complementary screw-threaded support part 68 (which may be a thickened boss part conjoining the peripheral flange portion 5a) of the upper section 5 and turnable by an outer knob 67c. A resilient O-ring or like seal 68c can be located about the valve stem 67a and in an annular recess in the support part 68 to prevent milk leakage through such part 68. The second bleed aperture 66 and the needle valve 67 provides the variable control and the first set bleed aperture 28 enables complete drainage to conform with dairy hygiene requirements.

The arrangements particularly described and illustrated have referred to the secondary valve chamber 18, conduit connections 19 and 20, and valve member 21, being located at the base of the device and the valve member 21 being normally biassed to a closed position under its own weight. It will be appreciated of course that the invention is not confined to these aspects as, for example:

(a) the closing or opening bias can be provided or assisted by such as a compression spring of appropriate strength located in the chamber and bearing on the valve member 21, and/or (b) the valve member 21 can be biassed to the open position where applicable to the air or vacuum system coupled to the conduit connection 19 and 20, and any associated apparatus actuable by such system, and/or (c) the secondary chamber 18, conduit connections 19 and 20, and valve member 21 can be located on the upper side of the device and the magnetic or magnetisable (as the case may be) actuating member 26 be provided in or on the upper side of the float member for holding the valve member in the prescribed open or closed position whilst the float member is fully raised with full flow of milk into the float chamber, the magnetic hold between the float actuating member 26 and valve member 21 being broken on milk level falling below a prescribed level and being overcome by the weight of the float member 12 and attached or embedded actuating member 26.

Figure 12:
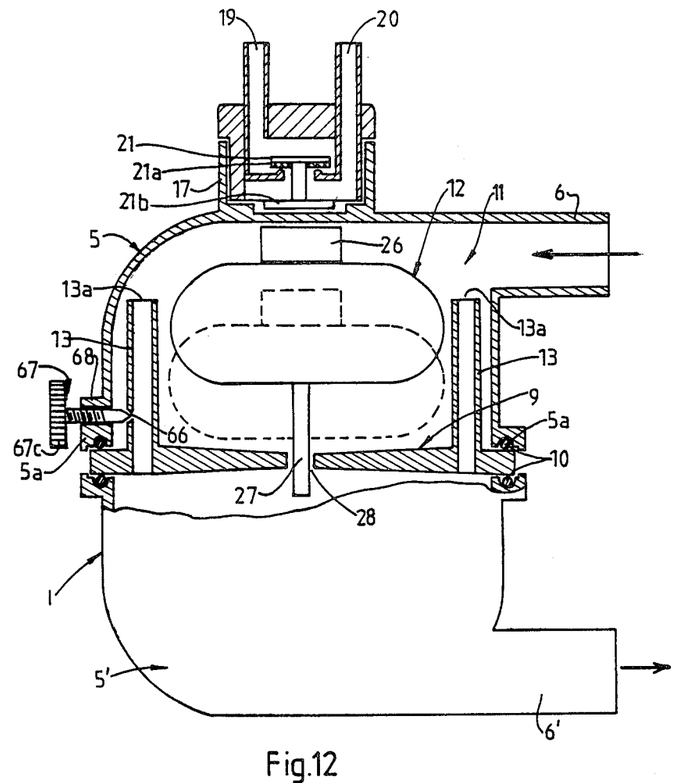

An example of this latter modification is shown in FIG. 12 with the float member 12 shown in full in the fully raised position with full milk flow and in broken outline with the float chamber 11 empty; the valve member 21 being held closed by the actuating member 26 against vacuum applied to conduit connection 19 or air pressure applied to conduit 20. This arrangement may suitably incorporate the variable control described with reference to FIG. 11.

Particular forms of the invention have been described and illustrated by way of example, but it will be appreciated that other variations of and modifications to the invention can take place without departing from the scope of the appended claims. For example, the invention is not confined to a rotary milking platform apparatus and alternative switching valve mechanism can be employed for the automatic teat cup removal apparatus in a stationary dairy system. Further, the fluid flow sensor and control device has been described with reference to milking equipment, but it will be appreciated that the device may have applications in other fields for the control of fluids.

I claim:

1. A milk flow sensor and control device constructed and arranged for use in dairy equipment for sensing the flow of milk from an animal and controlling the actuation of fluid pressure/vacuum operated teat cup support and retraction apparatus and removing and retracting the teat cups from the animal on cessation or substantial reduction of milk flow from the animal; said sensor and control device comprising a hollow body defining a float chamber and containing a float member and defining a separated outlet area, a milk inlet to the float chamber at the upper part of the body, at least one main milk outlet from the float chamber opening to an upper part thereof separate from said inlet and communicating with the outlet area, a minor or bleed outlet at or near the base of the float chamber for drainage of milk from the float chamber, said body also defining or being provided with a secondary chamber or duct sealed from the float chamber and outlet area and having a first port and a second port for the passage of fluid under pressure or vacuum and independent of milk passing into or out of the float chamber and outlet area, there being a valve means within the secondary chamber or duct and normally biassed to a first position but being movable against said bias to a second position, one of said first and second positions being a closed position preventing communication between the first and second ports of the secondary chamber or duct and the other of said first and second positions being an open position permitting communication between said secondary chamber first and second ports for the passage of said fluid under pressure or vacuum to effect actuation of the teat cup support and retraction apparatus and removal of the teat cups from an aminal; movement of said valve means being by way of an actuating member located in the outlet area of the body having a portion engaged or arranged for engagement with the float member and movement by said float member on flow of milk into the float chamber, and said bias being sufficient to cause return of the valve means to the first position on milk within the float chamber reaching a prescribed level.

2. A device as claimed in claim 1 wherein the body is divided by a divider member into upper and lower chambers with the upper chamber forming the float chamber housing the float member and the lower chamber forming the outlet area housing the actuating member, said actuating member being connected to the float member by way of a connection extending through a communicating passage in the divider member.

3. A device as claimed in claim 2 wherein said communicating passage defines the minor or bleed outlet for the float chamber.

4. A device as claimed in claim 2 wherein the body is formed with separate upper and lower sections and a separate divider member, and assembled with mating peripheral portions of the divider and body sections.

5. A device as claimed in claim 4 wherein the body upper and lower sections are formed with a similar open cup-like shape and configuration so as to be locatable in opposition with peripheral edge portions at the respective open sides in sealing engagement with the divider peripheral edge portion, the equivalent of the main milk inlet of the body upper section defining a main outlet for milk received in the lower chamber defined by the body lower section, the main milk outlet from the upper float chamber and the bleed outlet being in communication with said lower chamber.

6. A device as claimed in claim 1 wherein said valve means is movable against said bias by magnetic force applied between the actuating member and a valve member of the valve means.

7. A device as claimed in claim 6 wherein the actuating member is at least in part a permanent magnet and the valve member has at least a part thereof formed of a magnetisable material.

8. A device as claimed in claim 6 wherein the actuating member has at least a part formed of a magnetisable material and the valve member at least in part a permanent magnet.

9. A device as claimed in claim 6 wherein the valve member is of disc or plate form and located within the secondary chamber in a connector piece on the under outer side of the body in vertical alignment with the actuating member, said connector piece having the first and second ports for fluid under pressure or vacuum therein and at least one of which is located below the valve member so as to be closable by said valve member when resting thereover under its own weight, said weight being the bias.

10. A device as claimed in claim 1 wherein there is provided a means for varying the timing of actuation of the valve means.

11. A device as claimed in claim 10 wherein the valve means is movable against said bias by magnetic force applied between the actuating member and a valve member of the valve means, and the means for varying the valve means timing comprises adjustment of the spacing of the actuating member relative to the float member and valve member.

12. A device as claimed in claim 11 wherein the float member has upper and lower co-axial projections one of which is longer than the other and with either of which the actuating member can be linked, the float member being reversable and the actuating member being suspended from the lower projection.

13. A device as claimed in claim 10, wherein the means for varying the valve means timing comprises adjustment in the volume of milk containable in the float chamber below the main milk outlet opening of the float chamber.

14. A device as claimed in claim 13 wherein the body is divided by a divider member into upper and lower chambers with the upper chamber forming the float chamber housing the float member and the lower chamber the outlet area housing the actuating member, said actuating member being connected to the float member by way of a connection extending through a passage in the divider member, and wherein said divider member is provided with at least one open ended conduit part projecting vertically in unequal distances from upper and lower sides thereof and the upper end of which conduit forms the main milk outlet from the float chamber, said divider member being reversible on assembly to provide two alternative locations of main milk outlet.

15. A device as claimed in claim 13 wherein said adjustment in the volume of milk is arranged to be varied by provided adjustable limiting stop means controlling the maximum buoyancy level of the float member.

16. A device as claimed in claim 15 wherein the stop means comprises a vertically disposed screw-threaded control member projecting downwardly through an upper part of the body into the float chamber and arranged to be contacted by the float member or a projection thereof.

17. A device as claimed in claim 15 wherein the stop means comprises a turnable control member and a cam arrangement between said member and said float member.

18. A device as claimed in claim 17 wherein the control member comprises a vertical rotatable stem projecting downwardly through an upper part of the body into the float chamber and having a laterally projecting finger the outer end of which is arranged to be contacted by an upper helical face of the float member, said float member being restricted from axial rotation by guide means.

19. A device as claimed in claim 17 wherein the control member comprises a vertical rotatable stem projecting downwardly through an upper part of the body into the float chamber and having a helical cam capable of being contacted by a projection on the upper face of the float member.

20. A device as claimed in claim 15 wherein the stop means comprises a horizontally disposed rotatable shaft projecting into the body and having its inner end provided with a laterally projecting finger the outer end of which is arranged to be contacted by an upper surface of the actuating member or a like member engaged with a depending part of the float member.

21. A device as claimed in claim 20 wherein the body is divided by a divider member into upper and lower chambers with the upper chamber forming the float chamber housing the float member and the lower chamber the outlet area housing the actuating member, said actuating member being connected to the float member by way of a connection extending through a passage in the divider member, and wherein the control member is mounted on and supported by said divider member.

22. A device as claimed in claim 13 wherein the body is divided by a divider member into upper and lower chambers with the upper chamber forming the float chamber housing the float member and the lower chamber the outlet area housing the actuating member, said actuating member being connected to the float member by way of a connection extending through a passage in the divider member, and wherein the divider member is provided with at least one open ended conduit member which is disposed vertically through the divider member and is adjustable in height relative to the divider member, the upper open end of said conduit defining the main milk outlet for the float chamber.

23. A device as claimed in claim 22 wherein the conduit member is slidably engaged through the divider member and vertically adjustable from outside the device by a control member and associated rack and pinion arrangement.

24. A device as claimed in claim 1, wherein bleed varying means are provided to vary the rate of which milk in the float chamber below the main milk outlet can be drained or bled from said float chamber.

25. A device as claimed in claim 24 wherein said bleed means comprises a second bleed aperture and co-operating needle valve assembly provided near the base of the float chamber and in addition to said first minor or bleed outlet.

26. A device as claimed in claim 25 wherein said second bleed aperture is provided in a wall of a conduit member an upper end of which defines the main milk outlet, and the needle valve includes a stem with a tapered end portion extending at least partially into the aperture and with a screw-threaded part extending in and through a complementary screw-threaded support part of the float chamber wall to be turnable by an external knob.

27. A device as claimed in claim 1 in combination with milking teat cup support and retraction apparatus comprising a pneumatic cylinder and piston arrangement with a flexible link connected to the piston through an opening at one end of the cylinder for connection to a milking teat cup assembly, the other end of the cylinder being closed to define an operating chamber between the piston and said closed end part, a vacuum inlet to the closed end part of the operating chamber and whereby vacuum applied to the cylinder operating chamber can effect withdrawal of the piston inwardly of said operating chamber towards the closed end part, said vacuum inlet being connected to one port of the secondary chamber and the other port of the secondary chamber being arranged for connection to a source of vacuum supply, a flexible milk line from the teat cup assembly being connected to the liquid inlet to the float chamber for the supply of milk to said float chamber, and milk line closure mechanism actuable by movement of the piston and connected flexible link to close said milk line on cessation of milking and permit removal and retraction of the teat cup assembly.

* * * * *